June 18, 1968     C. J. P. LEBRE     3,388,820
LIFT TRUCKS WITH LATERALLY RETRACTABLE COUNTERBALANCING CASTERS
Filed March 17, 1965     3 Sheets-Sheet 1
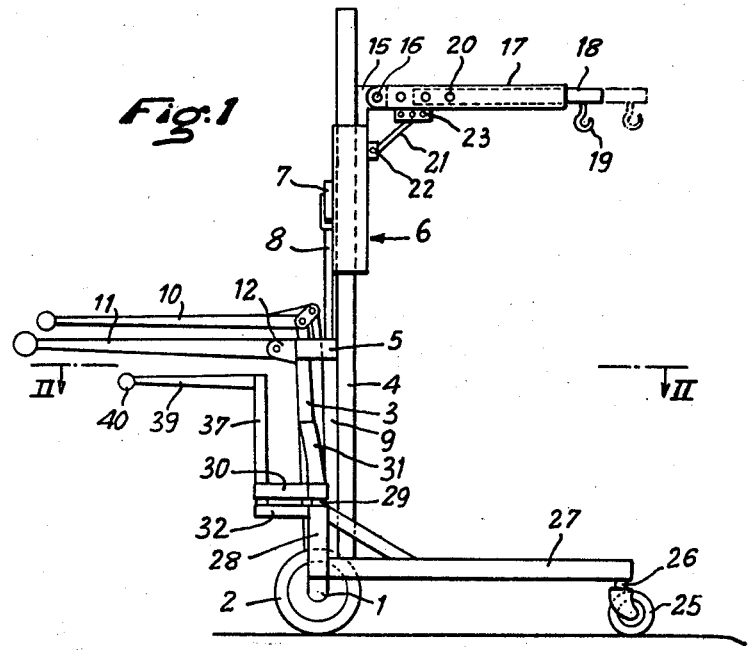
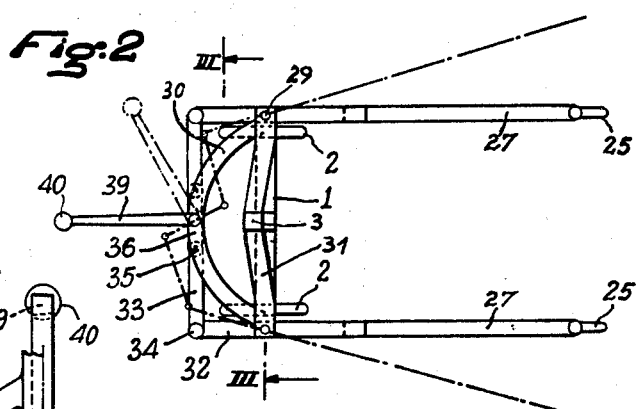
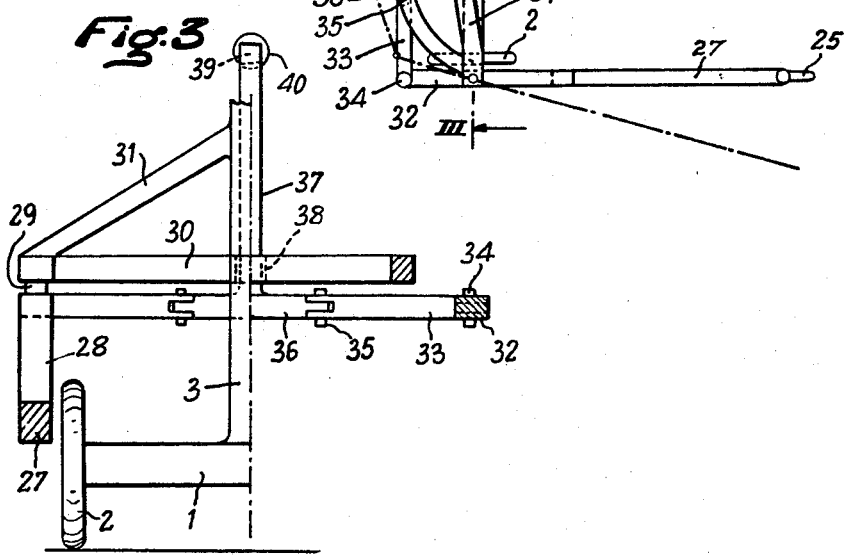

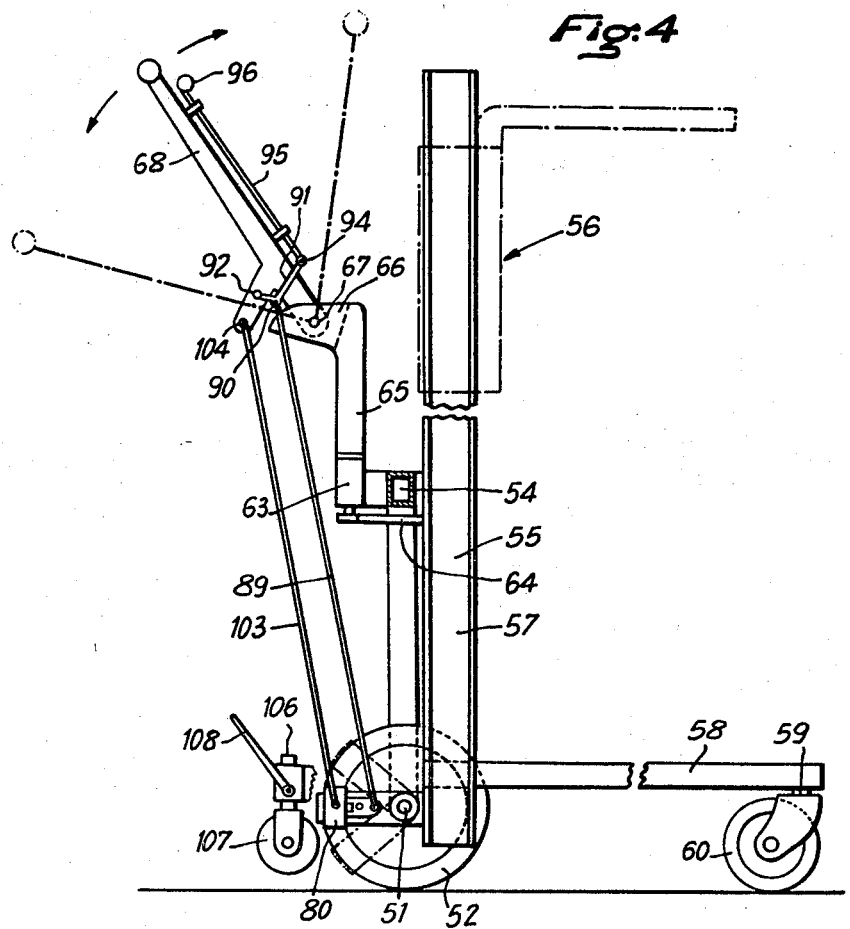
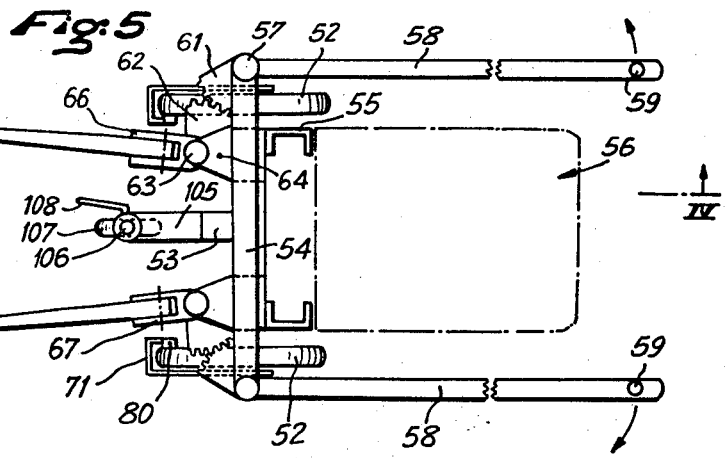

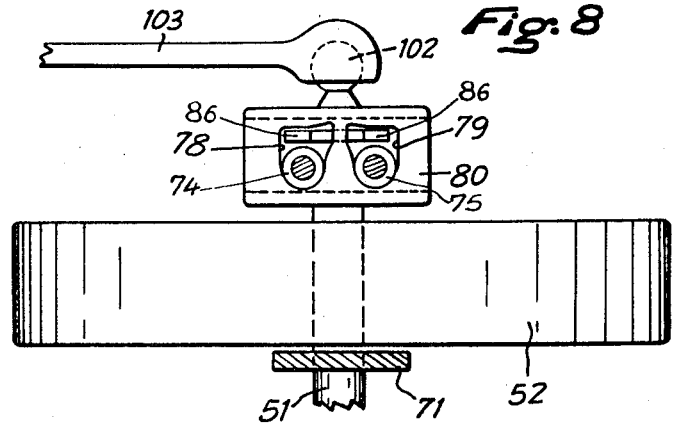
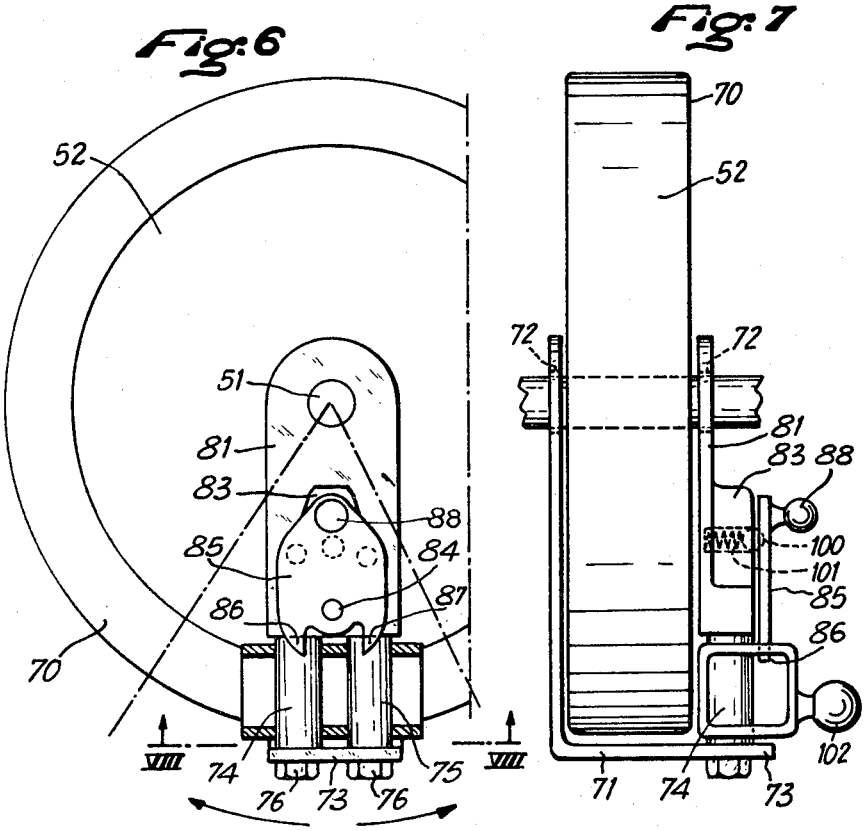

United States Patent Office 3,388,820
Patented June 18, 1968

3,388,820
LIFT TRUCKS WITH LATERALLY RETRACTABLE COUNTERBALANCING CASTERS
Charles Jean Pierre Lebre, 35 Avenue de l'Orangerie, Sainte-Genevieve-des-Bois, Essonne, France
Filed Mar. 17, 1965, Ser. No. 440,443
Claims priority, application France, Mar. 20, 1964, 968,113; Oct. 28, 1964, 992,955, Pat. 1,397,465
1 Claim. (Cl. 214—394)

ABSTRACT OF THE DISCLOSURE

The present manually-operated lift truck permits the gripping, hoisting, lowering and moving of a load and includes a wheeled frame, vertical load hoisting means on said frame, counterbalancing swivel casters carried by a linkage system connected to and extending in front of said frame, means connected to said linkage system for controlling the relative lateral spacing of said casters and means for driving the frame wheels either in a forward or a backward motion direction.

---

This invention relates to a manually-operated lift truck comprising a rigid frame provided with carrier wheels to permit its translation on the ground, and with a vertically movable member permitting of gripping, hoisting and lowering a load, this truck further comprising counterbalancing caster wheels located ahead of the carrier wheels and connected to the rigid frame through a pivoted assembly adapted to divaricate laterally said counterbalancing casters while keeping the relative distance between the casters and the carrier wheels to a constant value in order to permit the maximum approach of the truck to an encumbered place where it is desired to either deposit a load supported by said movable member or pick up a load.

The relative spacing or track of the counterbalancing casters is variable and adjustable by means of a linkage system responsive to actuating means fulcrumed about its axis with respect to the rigid frame.

According to a first form of embodiment of the invention, the counterbalancing casters are controlled simultaneously by means of a single control lever causing the simultaneously lateral retraction of the casters.

According to another form of embodiment of the invention each counterbalancing caster may be actuated and moved independently of the other.

The manually-operated lift truck according to the invention is adapted to hoist loads of about 400 to 1,100 pounds. Trucks of this character are useful in very different places, such as shops, storerooms, workshops, etc., where floors are mostly uneven and encumbered with miscellaneous articles. A heavily loaded truck cannot roll easily on such floors. On the other hand, when it is necessary to drive same up and down slopes, difficulties are experienced which cause a loss of time, additional and painful efforts and a substantial reduction in the safety of operation.

To avoid in spite of all the use of a costly engine when loads approximating 1,100 pounds are to be transported, while preserving the constructional simplicity, the manoeuverability and the safety characteristics of the hand truck, the lift truck of this invention is equipped with a manual-control driving mechanism of simple design, considerable efficiency and low cost.

To this end, a driving means co-acting with the periphery of the wheel associated therewith may be mounted in the vicinity of each carrier wheel of the truck, this driving means being freely pivoted on the axle of the carrier wheels and exerting thereon a self-locking or servo-action effect to rotate the wheel concerned.

The aforesaid driving means may either cause the wheel to revolve in one or the other direction for propelling the truck forward or backward, or be drivingly disconnected from the wheel. Each driving means is controlled separately by a reversing control mechanism actuated by hand or by foot.

As each carrier wheel is controlled separately the operator may either cause the driving means to operate the wheels simultaneously in the same direction, or drive one wheel forward and the other wheel backward, so that the truck may be swung on the spot with great facility, even if it is strongly loaded or has to be operated in normally inaccessible places.

Other features and advantages of this invention will appear as the following description proceeds with reference to the diagrammatic accompanying drawings in which:

FIGURE 1 is a side elevational view showing a first form of embodiment of a lift truck according to this invention;

FIGURE 2 is a plan view from above of the same truck;

FIGURE 3 is a section taken upon the line III—III of FIGURE 1;

FIGURE 4 is a diagrammatic section showing an alternate form of embodiment of the hand-operated lift truck, the section being taken upon the line IV—IV of FIGURE 5;

FIGURE 5 is a fragmentary plan view corresponding to FIGURE 4;

FIGURE 6 is a detail view showing on a large scale and in front view the driving means co-acting with a carrier wheel;

FIGURE 7 is a side view corresponding to FIGURE 6; and

FIGURE 8 is a section taken upon the line VIII—VIII of FIGURE 7.

In FIGURES 1, 2 and 3 there is shown a lift truck designed for lifting and transporting relatively light loads of the order of 400 to 500 lbs. and comprising a frame consisting of an axle 1 provided with carrier wheels 2 and a body 3 secured on the axle and constituting a reservoir for the fluid intended for the hydraulic operation of the truck. Secured to the reservoir 3 by means of brackets 5 is a vertical slideway 4 having slidably mounted thereon a boom 6 actuated by means of a rope secured at one end to the rigid frame and at its other end to the movable boom 6, this rope passing over a pulley 7 carried by the end of a piston rod 8 of a ram 9 secured to the rigid frame. This ram 9 is actuated by means of a lever 10 to move the slideway 4 up and down along the slideway 4. A handle 11 for operating the truck is pivoted and locked in a strap 12 solid with the rigid frame.

The boom 6 comprises a vertical upper member or bracket 15 having pivoted thereon at 16 a horizontal tubular member 17 in which an adjustable telescopic rod 18 carrying a suspension hook 19 or like gripping or load-hoisting member is slidably fitted. The adjustable rod 18 may be locked in predetermined longitudinal positions with respect to the tubular member 17 due to the provision of retractable studs carried by the rod 18 and engageable in one of a plurality of pairs of holes 20 formed in said tubular member 17.

To ensure an efficient holding of the telescopic boom in its operative position a stay rod 21 is pivoted at 22 on the vertical member 6 and attached at 23 to the tubular member 17. This stay rod 21 may be attached at several points 23 located along the tubular member 17 so that the latter can be disposed at will for example in a slightly upward inclined position with respect to the vertical members 6, instead of the perpendicular position illustrated, in order to improve the boom strength under relatively heavy loads.

It will be noted that the lift truck may consist of a power-driven machine or the like comprising the counterbalancing caster arrangement constituting one of the characteristic features of this invention and incorporating casters 25 pivoted by means of pivot-forming shanks 26 in longitudinal members 27 so as to swivel freely by rotation about said shanks 26. These longitudinal members 27 are rigid with vertical uprights 28 extending at right angles thereto in the vertical plane of the truck frame axle 1, externally of the carrier wheels 2. The vertical uprights 28 are pivotally supported in turn by pivot pins 29 rigid with an auxiliary frame structure 30 rigidly assembled with the truck frame by means of a pair of fixed stay rods 31 rigid with the reservoir body 3.

Furthermore, each vertical upright 28 has its upper end solid with an arm 32 extending backwards at right angles to the relevant upright and having its free end pivotally connected to a link 33 by means of a pivot pin 34.

Under normal operating conditions the links 33 extend at right angles to the arms 32 and are coupled through pivot pins 35 to a rudder bar 36 rigid with a control level comprising a vertical portion 37 secured to the middle of rudder bar 36 and extending through an aperture 38 formed in the auxiliary frame structure 30 so as to pivot about its axis in relation thereto. A horizontal lever forming portion 39 rigid with the vertical portion 37 and carrying a handle or knob 40 at its outer or free end extends backwards to constitute an easy-grip control member for the operator. The control lever 39 is locked in the normal position shown in thick lines in the drawing by any known and suitable means, for example a spring-loaded ball or stud.

It will be noted that the respective lengths of links 33 and rudder bar 36 may be variable, their ratio determining the permissible degree of divarication of the casters 25.

When the over-all dimensions of the load to be hoisted are relatively important, the control lever 39 is moved to the position shown in chain-dotted lines in FIGURE 2 by causing this lever to pivot in the aperture 38 formed in the auxiliary frame structure 30. This movement of lever 39 causes the rudder bar 36 to pivot, and thus move the pivot pins 34 towards the longitudinal center line of the truck, thus causing the longitudinal members 27 to pivot about their pivot pins 29 and moving the casters 25 away from each other as shown in FIGURE 2. When the casters are sufficiently divaricated to permit their passage on either side of the load to be lifted, the truck is moved forwards until the boom 6 can grip the load. Then the load is raised slightly off the ground to permit the return of the casters to their normal position illustrated in thick lines in FIGURE 2. If desired, the load may be caused to rest upon the longitudinal members 27 to improve the safety of translation of the load.

It will be noted that the truck can be moved while keeping the casters 25 in their outermost or fully divaricated position, since these casters can swivel freely.

Now a specific and alternate form of embodiment of a lift truck designed for lifting heavier loads of the order of 1100 pounds will be described.

In FIGURES 4 and 5 there is designated by the reference numeral 51 a carrier axle of a lift truck comprising two carrier wheels 52, and 53 is the reservoir body adapted to contain the pump and load hoisting mechanism (not shown), 54 being a cross member rigid with the reservoir body 53, on which the vertical slideways 55 acting as guide members to a hoisting member 56 are secured. This assembly constitutes the frame structure of the truck and may be similar to the structure described hereinabove with reference to FIGURES 1 to 3.

Pivoted to the ends of the cross member 54 of the frame structure are depending vertical rods 57 respectively rigid at their lower ends with a horizontal arm 58 carrying at its outer end a free swivelling caster 60 mounted by means of a vertical pivot pin 59. Each vertical rod 57 has secured thereto a toothed sector 61 in constant meshing engagement with another toothed sector 62 constituting the driving member rigid with a vertical shaft 63 rotatably mounted on the rear face of cross member 54 by means of brackets 64. Each vertical shaft 63 has an upward extension in the form of a pivoting rod 65 rigid with said shaft 63 and carrying at its upper end a strap 66 on which a control lever 68 is pivotally mounted.

The control levers 68 are movable in a horizontal plane by the truck operator to rotate the shafts 63. These shafts 63 cause in turn the toothed sectors 62 to rotate and due to their meshing engagement with the relevant toothed sectors 61 they cause the counterbalancing casters 60 to swivel about the vertical pivot pins 57. It will be noted that to a moderate outward angular movement of control levers 68 there corresponds a relatively large outward movement of the casters 60, due to the reduction ratio provided by the different members included in the transmission.

By actuating the levers 68 it is also possible to move the truck forwards or backwards without having to push same. To this end, the levers 68 are moved in a vertical plane. The mechanism for driving the truck forwards or backwards is shown in detail in FIGURES 6, 7, 8 and comprises, in the vicinity of each carrier wheel 52 of which the reference numeral 70 designates the side of the peripheral tyre, an L-shaped member 71 formed with a hole 72 to permit the mounting with play thereof on the axle 51. This plate 71 extends parallel to a radius of one side of the carrier wheel 52 and its bent portion parallel to the wheel axis projects at 73 beyond the other side face of the wheel and receives therethrough a pair of bolts 77 of which the heads 76 bear on the end 73 of plate 71; a pair of parallel tubular distance-pieces 74, 75 lying in a plane parallel to the plane of wheel 52 extend substantially radially towards the axle 51 and are housed in adequate recesses 78, 79 formed in a hollow parallelepipedic members 80 having one face parallel to the side face 70 of the wheel tyre. The bolts 77 carrying said distance-pieces have their ends screwed in a plate 81 mounted with clearance on the axle 51 by means of an aperture 82 so that this plate 81 may rotate freely about the axle. This plate 81 extends radially and is parallel to the aforesaid plate 71; it is formed with an external projecting boss 83 having pivotally mounted thereon at 84 a reversing member 85 formed with a pair of teeth 86, 87 adapted to engage respectively the aforesaid distance-piece recesses 78, 79 of hollow member 80. By pivoting about the pin 84 the reversing member 85 is adapted to assume three different positions, namely a neutral position as shown in the drawing, in which the teeth 86 and 87 are engaged in the corresponding recesses 78 and 79 of the hollow member 80; a "forward motion" position in which the reversing member 85 is moved to the left (FIGURE 6) about its pivot pin 84 so that the tooth 86 engages the recess 78 and tooth 87 moves out from recess 79; and, finally, a "backward motion" position in which the reversing member 85 is moved to a position symmetrically opposite to that required for the "forward motion" operation.

The reversing member 85 is pivoted by means of a ball 88 carried by this member and opposite to its pivot pin 84, and between the recesses 78 and 79, this ball 88 being connected through a reversing control rod 89 to a low pivot point or fulcrum 90 of a triangular member 91 having its other two vertices pivoted the one at 92 on a projecting portion 93 of control lever 68 and the other at 94 on the end of a push rod 95 slidably mounted on the control lever 68 and operable manually.

The reversing member 85 is held in each one of its three positions by means of a conventional detent-positioning device comprising for example a ball 100 housed in the boss 83 of plate 81 and urged by a spring 101 against the member 85, this ball being engageable by turns in three cavities formed on the lower face of reversing member 85.

The hollow parallelepipedic member 80 carries a ball 102 connected by means of a control rod 103 to the end 104 of the projecting portion 93 of control lever 68.

The lift truck is completed by a bracket 105 supporting an auxiliary wheel 107 and rigidly secured to the frame at the rear and centrally thereof. This auxiliary wheel 107 is pivoted on the bracket 105 by means of a vertical spindle 106 permitting the free swivel movements of the wheel. As shown in FIGURE 4, in the normal position of operation of the lift truck, that is, when the truck rolls on the floor by means of its carrier wheels 52 and front casters 60, the auxiliary wheel 107 is raised off the ground. If it is desired to increase the safety of operation of the truck during a loading operation or a manoeuvre (for example when it is desired to move the truck laterally without changing its direction and therefore the direction of the boom 56), the auxiliary wheel 107 is lowered to cause same to engage the floor by actuating a lever 108 operating a conventional cam device (not shown). The vertical stroke of this auxiliary wheel 107 is so calculated that when it is lowered the carrier wheels 52 do not contact the floor. Then the truck is supported at three points, that is, the pair of front casters 60 and the auxiliary wheel 107, these three wheels being of the free swivelling type. Thus, the truck can be moved very easily.

Now, the operation of the mechanism for driving the carrier wheels 52 will be described in detail.

Assuming that the truck is heavily loaded and cannot be pushed directly by hand, the operator will operate the push members 96 slidably mounted on the control levers 68.

To simplify the disclosure it will also be assumed that the position of push member 96 which is shown in the drawing corresponds to the neutral position. In this position the reversing member 85 is also in the neutral position shown in FIGURE 6, so that both teeth 86 and 87 engage the recesses 78 and 79 formed in the hollow member 80, whereby the face of hollow member 80 which registers with the side face of the tyre 70 of wheel 52 is kept parallel to, and slightly spaced from, this tyre. Under these conditions, when the operator actuates the control lever 68 the control rod 103 causes the assembly consisting of driving members 71, 80 and 81 to pivot about the axle 51 without exerting any driving action upon the wheel 52. The angle through which this driving assembly is pivoted is subordinate to the permissible stroke of control lever 68 and can be adjusted in any suitable and known manner.

When the truck operator wishes to drive the truck forwards by acting directly upon the wheels 52, he pushes the control knob or handle 96 home, that is, toward the pivoted end 67 of lever 68, thus causing the triangular member 91 to pivot about its fulcrum 92 in the clockwise direction. The rod 89 is thus pushed downward and causes the reversing member 85 to revolve clockwise about its pivot pin 84. Thus, tooth 87 engages its recess 79 to a greater extent, causing the distance-piece 75 to become locked while releasing the other tooth 86 from its recess 78. The reversing member 85 is retained in this position by the spring-loaded ball 100.

Then a vertical reciprocating motion is imparted to the control lever 68 in the direction of the arrows, FIGURE 4, between two end positions shown in chain-dotted lines. The control lever 68 pivoting about its fulcrum 67 in the clockwise direction as seen in FIGURE 4 (i.e., towards the front of the truck) moves the rod 103 upwards, whereby the socket end of this rod 103 will pull the ball 102 of hollow member 80 to the left as seen in FIGURE 8, this member 80 pivoting in the counter clockwise direction about the distance-piece 75 and bearing with an edge against the lateral face of the periphery 70 of wheel 52. Thus, the hollow member 80 is locked against the wheel 52 and as the rod 103 continues its upward movement and carries along the hollow member 80, the wheel 52 is positively rotated in the clockwise direction as seen in FIGURE 4, thus imparting a forward motion to the truck. This driving action is inasmuch efficient as the hollow member 80 and wheel 52 are locked to each other by means of an edge.

Upon completion of the forward stroke of lever 68, that is, when this lever has attained its uppermost position as shown in FIGURE 4, the wedging effort of the hollow member 80 is cancelled and when the lever 68 is moved again downwards in the counterclockwise direction, the rod 103 restores the hollow member 80 to its straight or upright position until the distance-piece 74 has resumed its position in the bottom of its recess 78 without being allowed to tilt beyond this recess. As the hollow member 80 is now spaced from the periphery 70 of wheel 52, and the downward movement of rod 103 continues, the driving assembly 71, 80, 81 will pivot about the axle 51 in the counter clockwise direction to resume its low position.

If the operator wishes to move the truck backwards, he simply pulls home the rod 96 towards himself, thus moving the tooth 87 out from its recess 79 and inserting more deeply the other tooth 86 into its recess 78. In this case the operation is quite similar to that set forth hereinabove in connection with the forward motion but the positive or operative movement of control lever 68 takes place when this lever is pivoted in the counter clockwise direction.

This arrangement is logical for the truck operator will walk while pushing the control lever 68 in its clockwise direction when he wishes to move the truck forwards, the operator receding while pulling the control lever 68 in the counter clockwise direction for backing the truck.

The two lever arms 68 may be actuated in a vertical plane irrespective of the position of the counterbalancing casters 60, that is, of the relative angular position of these levers 68 in a horizontal plane.

It will also be noted that although the reciprocating movements of levers 68 consists of a positive, truck-driving movement, and of a negative movement producing no action whatsoever on the truck, the truck can be moved continuously by actuating the two levers 68 in opposite directions, so that a positive movement of one lever will correspond to a negative movement of the other lever. Thus, there is always one of the wheels 52 driven by the mechanism.

On the other hand, this arrangement imparts a considerable degree of manoeuverability to the truck. In fact, the truck can be pivoted on the spot without any effort by causing one wheel 52 to be driven in the forward-motion direction and the other wheel 52 to be driven in the backward-motion direction. This can be done rapidly by pushing the push member 96 of one lever 68 to its forward-motion position and pulling the push member 96 of the other lever 68 to its backward-motion position.

It is also very easy to turn the truck nearly at right angles by uncoupling one of the wheels 52 of its driving mechanism and simply placing the corresponding push member 96 in neutral. As this wheel is not driven it remains stationary and by actuating the other lever 68 connected to the other wheel the truck will turn about the first wheel.

It will be readily understood that this description should not be construed as limiting the present invention since many modifications may be brought thereto without departing from the spirit and scope of the invention as set forth in the appended claims.

What I claim is:

1. A lift truck for hoisting a load from the ground comprising a rigid frame, carrier wheels supporting said rigid frame and permitting the translation of the truck on the ground, a vertical slideway rigid with said frame, a hoisting member slidably mounted on said vertical slideway, front counterbalancing casters adapted to swivel freely, a linkage system articulated to the rigid frame at one end and carrying said front counterbalancing casters at the other end, an actuating means articulated to the rigid frame and connected to said linkage system for controlling the lateral relative spacing of said counterbalancing casters, said actuating means comprising two levers, each having a toothed sector meshing with a toothed sector rigid with said linkage system of the corresponding counterbalancing caster for moving laterally away from each other said casters simultaneously or separately upon actuation of said levers in a horizontal plane, and a controlling means for driving the carrier wheels so as to rotate same either in the forward-motion direction or in the backward-motion direction.

References Cited

UNITED STATES PATENTS

| | | | |
|---|---|---|---|
| 2,547,269 | 4/1951 | Kinsey | 214—390 |
| 2,706,120 | 4/1955 | Stratton. | |
| 2,899,093 | 8/1959 | Morrell | 187—9 X |
| 2,977,012 | 3/1961 | Maunula | 241—505 X |

ALBERT J. MAKAY, *Primary Examiner.*